Figures 1, 2:
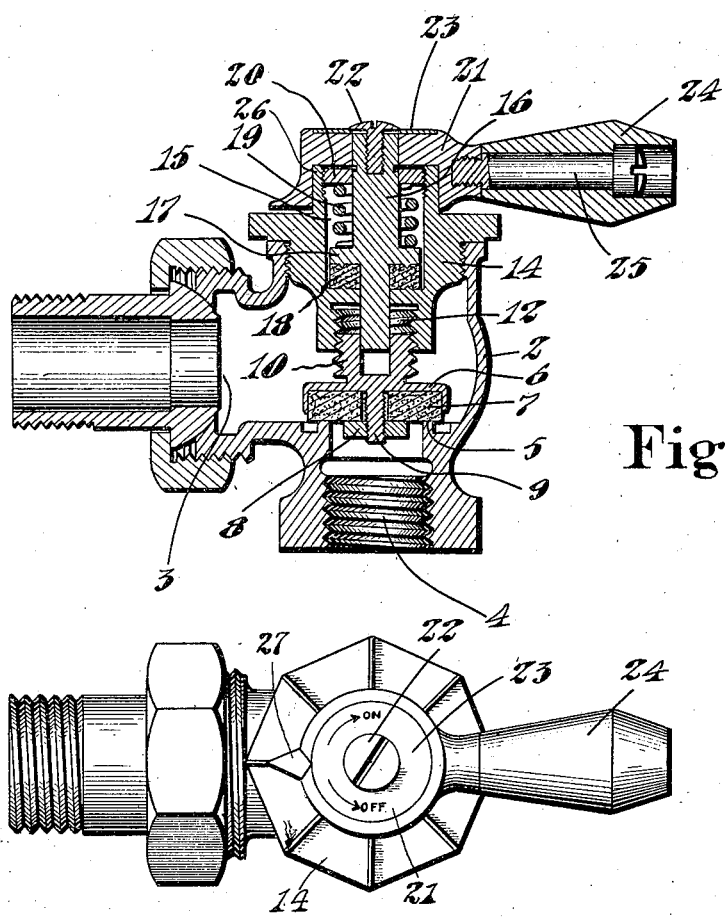

Nov. 8, 1927.

W. D. CASHIN ET AL 1,648,260

PACKLESS VALVE

Filed Aug. 21, 1924

INVENTORS

Patented Nov. 8, 1927.

1,648,260

UNITED STATES PATENT OFFICE.

WILLIAM D. CASHIN, OF WEST ROXBURY, AND MAX P. MILLER, OF WABAN, MASSACHUSETTS, ASSIGNORS TO W. D. CASHIN CO., OF BOSTON, MASSACHUSETTS, A CORPORATION OF MASSACHUSETTS.

PACKLESS VALVE.

Application filed August 21, 1924. Serial No. 733,273.

This invention relates to valves and will be herein disclosed as embodied in a valve designed especially to control the flow of steam to radiators, it being understood, however, that the invention is also applicable to other forms of valves.

It is the chief object of the invention to improve the construction of valves with a view to reducing the cost of manufacture of articles of this type, to produce a more reliable valve, and devising a construction which will be less likely to get out of order and will have a longer life than prior constructions.

The nature of the invention will be readily understood from the following description when read in connection with the accompanying drawings, and the novel features will be particularly pointed out in the appended claims.

Referring now to the drawings,

Figure 1 is a vertical, cross-sectional view of a valve embodying this invention; and Fig. 2 is a plan view of the valve shown in Fig. 1.

The construction shown comprises a valve casing 2 having a chamber therein for steam or other fluid which is to be controlled by the valve, an inlet 3 and outlet 4 for the steam being provided. For convenience the fluid which is to be controlled by the valve will be referred to hereinafter as "steam". A valve seat 5 is formed in the casing and cooperates with a valve plunger 6 in controlling the flow of steam. This plunger includes a packing disk 7 which is secured to the face of the metal part 6 by means of a nut 8 threaded on a stem 9 which projects from the member 6.

Projecting from the upper part of the plunger 6 is a screw threaded shank 10 which is located in an internally threaded hole 12 formed in the lower end of a bonnet 14 that is threaded into the upper part of the casing 2. This bonnet has a vertical chamber 15 formed in its upper end, and a valve stem 16 extending centrally through this chamber has its lower end made square in cross-section to fit loosely in a square hole in the upper end of the threaded shank 10. Consequently, as this stem is turned it will rotate the plunger 6, and this rotary motion will, due to the engagement of the threads on the part 10 with those in the hole 12, move the valve plunger into and out of engagement with its seat 5.

A stem 16 is provided with an enlargement or shoulder 17 which bears on a packing disk 18, and this disk is forced into firm engagement with the bottom wall of the chamber 15 by means of a coiled spring 19 which encircles the stem 16 and is backed up by a nut or disk 20 threaded into the wall of the chamber 15 at its upper end. The faces of the shoulder 17 and the part 14 which engages the washer 18 are provided with annular beads that bite into the opposite faces of the washer, as clearly shown in Fig. 1. It will be observed that the bonnet 14 closes the top of the casing 2 and that it is imperforate except for the opening which receives the circular part of the stem 16 immediately below the shoulder 17. Any leakage through this aperture, however, is effectually prevented by the packing 18.

A cap 21 is secured to the upper end of the stem 16 by means of a screw 22 and washer 23, and a handle 24 projects laterally from this cap and is secured thereto by means of a screw 25. The cap 21 sets down over the tubular extension 26 of the bonnet 14 and is provided with a pointer 27 which cooperates with graduations or marks formed on the upper flat surface of the bonnet 14 to indicate the degree of adjustment of the valve. Preferably the washer 23 bears arrows associated with the words "On" and "Off", as clearly shown in Fig. 2, which indicate the direction that the handle 24 should be turned to open or close the valve.

Attention is particularly called to the peculiar construction of the bonnet and to the manner in which the packing and the handle are associated with the bonnet. That is, the bonnet includes both the internal thread for the shank 10, and also the spring chamber, and the packing disk is so located that steam can reach it only by leaking past the threads 10—12 and through the aperture formed in the bonnet to receive the valve stem. The packing effectually prevents any leakage of steam into the spring chamber 15, so that both the packing disk 18 and the spring 19 are protected from the action of the steam. This arrangement materially increases the length of life of both the spring and the packing and prevents the corrosion of the spring by steam coming in contact with it, which is so common in devices of this character. The mounting of the cap 21 permits the removal of the handle without disturbing the spring 19 or the packing. It should also be observed that the valve has very few parts, and these parts are of such design that they can be manufactured very economically.

While we have herein shown and described the best embodiment of our invention that we have so far devised, it will be evident that the invention may be embodied in other forms without departing from the spirit or scope thereof.

Having thus described our invention, what we desire to claim as new is:

1. A valve of the character described comprising, in combination, a valve casing having a steam chamber therein with an inlet and outlet for the steam, a valve seat in said casing, a valve plunger movable into and out of engagement with said seat, a bonnet threaded into said casing and having a body portion located in said casing, said bonnet including a tubular extension projecting upwardly therefrom with a chamber formed partly in said extension and partly in the body portion of the bonnet within the casing, a valve stem projecting through said chamber and connected with said plunger to adjust the plunger relatively to said seat, a packing located in said chamber and surrounding said stem, a spring encircling said stem and serving to compress said packing, a disk threaded into the upper end of said extension and bearing on said spring, a cap fitting over said extension and removably secured to the upper end of said stem, and a handle secured to said cap.

2. A valve of the character described, comprising, in combination, a valve casing having a steam chamber therein with an inlet and outlet for the steam, a valve seat in said casing, a valve plunger movable into and out of engagement with said seat, said plunger including a packing disk 7 for engaging said seat and a metal backing 6 for said disk, a threaded shank 10 integral with said metal backing, a bonnet threaded into the upper part of said casing and having a screw threaded aperture in its lower end to receive said threaded shank, said bonnet having a chamber in its upper end, a stem extending through the chamber in said bonnet and having a slidable connection with said shank but arranged to turn the shank, said stem having a shoulder thereon, a packing disk interposed between said shoulder and the bottom of the chamber in said bonnet, a spring bearing on said shoulder, a disk threaded into said chamber and backing up said spring, and a handle secured to said stem above said disk.

In testimony whereof we have hereunto signed our names to this specification.

WILLIAM D. CASHIN.
MAX P. MILLER.